US005949074A

United States Patent [19]
Dombrowski et al.

[11] Patent Number: 5,949,074
[45] Date of Patent: Sep. 7, 1999

[54] IMAGING SPECTRORADIOMETER

[75] Inventors: Mark Dombrowski; James Lorenz, both of Escondido, Calif.

[73] Assignee: Surface Optics Corporation, San Diego, Calif.

[21] Appl. No.: 09/168,204

[22] Filed: Oct. 6, 1998

Related U.S. Application Data

[63] Continuation of application No. 08/777,112, Dec. 30, 1996, Pat. No. 5,821,535, which is a continuation of application No. 08/485,583, Jun. 7, 1995, Pat. No. 5,602,394, which is a continuation-in-part of application No. 08/049,035, Apr. 19, 1993, Pat. No. 5,424,543.

[51] Int. Cl.$^6$ .............................. G01T 1/36; G01T 1/29; G01J 5/10
[52] U.S. Cl. ................... 250/339.02; 250/334; 250/352; 250/370.06; 250/370.08; 250/370.09
[58] Field of Search ............................. 250/339.02, 334, 250/352, 370.06, 370.08, 370.09

[56] References Cited

U.S. PATENT DOCUMENTS

| | | |
|---|---|---|
| 3,848,130 | 11/1974 | Macovski . |
| 5,044,002 | 8/1991 | Stein . |
| 5,202,767 | 4/1993 | Dozier et al. . |
| 5,212,384 | 5/1993 | Fouilloy . |
| 5,214,503 | 5/1993 | Chiu et al. . |
| 5,251,021 | 10/1993 | Parulski et al. . |
| 5,276,319 | 1/1994 | Hepfer et al. ......................... 250/208.1 |
| 5,300,780 | 4/1994 | Denney et al. .......................... 250/342 |

FOREIGN PATENT DOCUMENTS 55-142218  11/1980  Japan .

OTHER PUBLICATIONS

Xybion Systems, "An Intensified Multispectral Video System," 2 page brochure (Jun. 1990).
Benjamin J. Kennedy, "Intensified Multispectral Imaging Measuring in the Spatial, Frequency and Time Domains with a Single Instrument," 7 page preprint (undated).
CI Systems, "Spectracube 1000", 1 page brochure (undated).
Robert O. Green, 5 page letter (Jun. 1, 1993).
EG&G, "OMA$^R$ III" 12 page brochure (Apr. 1990).
EG&G, "GS–1200 Series RadOMA$^R$", 2 page brochure (undated).
Optronic Laboratories, "Automated Spectroradiometric Measurement Systems," 6 page brochure (1988).
Photo Research, "PR–704/PR–714 SpectraScan$^R$ Systems", 8 page brochure (1990).
EG&G, "Model 880 Automatic Spectroradiometer" 4 page product brochure (undated).
Mark Dombrowski, "Development and operation of a real--time imaging spectroradiometer," 11 page preprint (undated, but presented Jun. 1992).

*Primary Examiner*—Constantine Hannaher
*Attorney, Agent, or Firm*—Gregory Garmong

[57] ABSTRACT

A spectroradiometer images a scene as a repeating sequence of spectral images, each of which spectral images depicts the scene at a preselected wavelength. In a preferred embodiment, the image is of size 256 by 192 pixels, and the sequence repetition rate is about 20–30 cycles per second. Full spectral analysis on the resulting sequences is performed substantially in real time. The spectroradiometer includes a collector of energy in the X-ray or infrared ranges with a lens, a circularly variable spectral filter, and a gate which gates the output of the filter to a detector array which outputs the sequence of electronic spectral images. These images are corrected for systematic errors and calibrated, and correlated with a preselected spectral response function. The image may be further post-processed and displayed in video format or used otherwise.

15 Claims, 6 Drawing Sheets

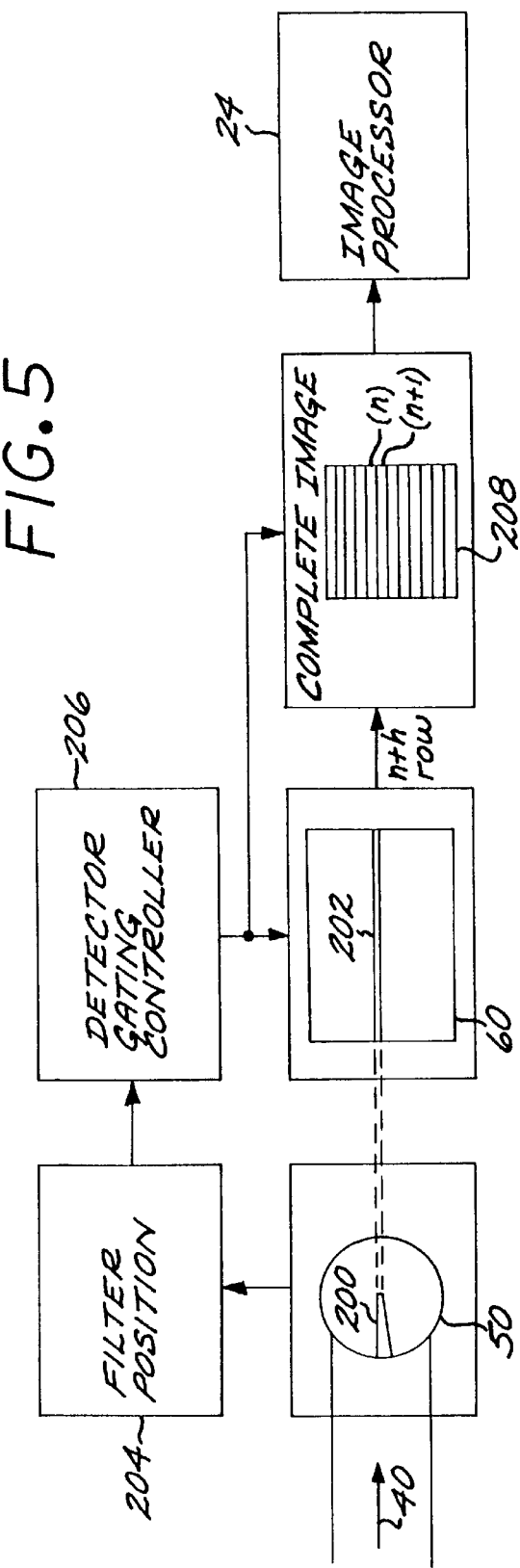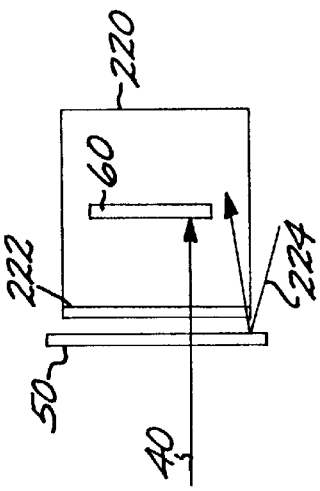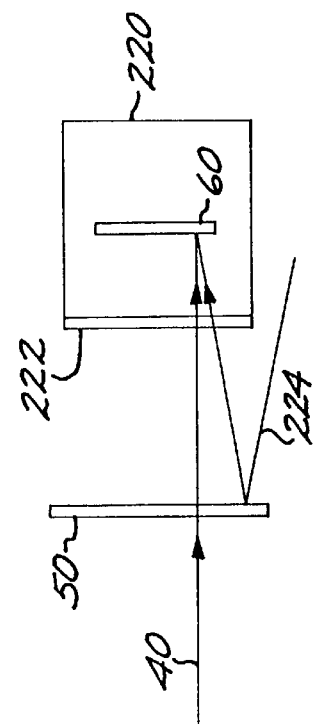

IMAGING SPECTRORADIOMETER

This application is a continuation of application Ser. No. 08/777,112, filed Dec. 30, 1996, now U.S. Pat. No. 5,821,535; which is a continuation of U.S. application Ser. No. 08/485,583, filed Jun. 7, 1995, now U.S. Pat. No. 5,602,394; which is a continuation-in-part of application Ser. No. 08/049,035, filed Apr. 19, 1993, now U.S. Pat. No. 5,424,543. Priority to all of these prior applications is claimed, and the disclosure of all of these prior applications is incorporated by reference.

BACKGROUND OF THE INVENTION

This invention relates to the spectral analysis of a scene, and, more particularly, to an instrument that can form and analyze the spectral radiances at each pixel of an image, in real time for continuous motion.

The objects in a scene are characterized by their spatial forms and their spectral radiances. The spectral radiance of an object is its reflected light intensity as a function of wavelength, and is indicative of the material which forms the object. Although the human eye can distinguish forms very well, it does not discern spectral radiance characteristics nearly as precisely. Instead, the human eye perceives only a dominant portion of the spectral radiance, which is perceived as the color of the object.

Since the spectral radiance of an object is a characteristic of that object, in principle most objects can be identified by their spectral radiances alone. However, because the human eye is a relatively unsophisticated observer of spectral radiances, it is not always possible to distinguish objects based upon their perceived colors. For example, at a distance a field of green corn cannot be readily distinguished from a field of green grass simply by their colors. On the other hand, the corn and the grass are readily distinguished from each other on the basis of their different spectral radiances, if the complete spectral radiances can be used in the analysis.

The spectroradiometer is an instrument that analyzes the spectral radiance of objects in its field of view. Existing spectroradiometers are designed to view only a single region at a time to obtain a pure spectral radiance of that region. An entire scene can be analyzed using the same approach in conjunction with one of several scanning techniques that steps the analysis region over the entire field of view. Such scanning spectroradiometers are relatively slow in operation. In particular, they cannot operate at the minimum rate of about 20–30 frames per second required to view a scene in what the eye perceives as continuous motion. Additionally, available spectroradiometers have limited usefulness in the infrared and X-ray portions of the spectrum.

There is therefore a need for high-speed imaging spectroradiometers that can perform spectral analysis on a pixel-by-pixel basis of entire scenes at rates of at least about 20 frames per second, and are useful in the infrared and X-ray spectra. Such spectroradiometers could be used in many applications such as medical diagnostics, earth resources, and resource management. The present invention fulfills this need, and further provides related advantages.

SUMMARY OF THE INVENTION

The present invention provides an imaging spectroradiometer that allows the spectral radiance imaging of each pixel in a scene. With this instrument, it is possible to image features in the scene according to their spectral radiances, so that regions differing in composition or other characteristics can be distinguished. In its various versions, the spectroradiometer is operable in the infrared and X-ray spectra. The spectroradiometer has a frame repetition rate of at least about 20 frames per second for conventional moderate-resolution spectral analysis. This rate allows the imaging to occur with the visual appearance of smooth movement. In a preferred form, the camera speed is 600 frames per second, enabling a 20-point spectrum to be imaged in real time at a rate of 30 times per second.

In accordance with one embodiment of the invention, an imaging spectroradiometer comprises a light collector, an image processor, and desirably an image post processor and a display. The light collector includes a lens which produces a two-dimensional viewed image of a scene, and means for spectrally filtering a repeating sequence of spectral images from the viewed image over a preselected spectrum of wavelengths. The means for spectrally filtering includes means for repeating the spectral imaging of the scene over the preselected spectrum at a preselected sequence repetition frequency, and means for scanning a filter window of a preselected wavelength transmission across the scene during each repetition. The detector receives the image of the preselected spectrum of wavelengths from the means for spectrally filtering and produces an electronic signal of an amplitude of each of a plurality of pixels. The detector electronically scans a detection gate window across the scene in synchronization with the scanning of the filter window.

Another embodiment is similar, except that the means for spectrally filtering includes means for sequentially producing a sequence of filtered images of an entire scene at a sequence of wavelengths (i.e., a "snapshot"). The detector receives the sequence of filtered images from the means for sequentially producing and produces an electronic signal of an amplitude of each of a plurality of pixels of the scene.

In the preferred approach, the means for spectrally filtering and the detector are operable in the infrared. The lens is a controllable zoom lens which allows wide angle or narrow angle viewing of a scene. Spectral filtering is performed by a circular variable filter in the ray path, driven at a controllable, variable speed. The detector may be a charge-coupled device array having a plurality of sensor elements is preferred, and in a preferred embodiment the detector includes a 256 horizontal×192 vertical array of sensor elements.

The real time image processor comprises a memory which temporarily stores the electronic signals produced by the detector as a plurality of pixelated electronic images, with each image corresponding to an amplitude of the scene viewed at one of the preselected wavelengths. There is means for correcting the amplitudes of the pixels of the electronic images responsive to preselected systematic sources of error and means for calibrating the amplitudes responsive to the optical properties of the light collector, producing a corrected and calibrated electronic image. The image processor also includes means for correlating the corrected and calibrated electronic image with a response function to produce an electronic image of a preselected spectral characteristic.

The image post-processor, where present, includes means for manipulating the processed electronic images, such as by identifying particular spectra of interest for specific applications.

The display, where present, preferably is a video monitor, with the electronic images formatted for display on the monitor. The display presents a perceived continuous motion of the image, since a frame rate of about 20–30 repetitions per second (or more) is interpreted by the human eye as continuous motion. The output of the image processor is a digital signal which may be converted to analog form for display or used in a digital form for display or further processing and interpretation.

The imaging spectroradiometer operates substantially in real-time to image the spectral radiance at each pixel of a viewed scene. As used herein "substantially in real time" means that the processed output image is produced at the same rate as the input image data is gathered, with a delay corresponding to the frame rate. The spectroradiometer can operate at a frame rate of about 20–30 frames per second or more, which permits the display of motion in a manner that is perceived by the human eye to be continuous. Thus, the delay in outputting a processed two-dimensional image is 1/20–1/30 of a second or less after the scene is viewed.

The ability to perform the spectral analyses at such a perceived continuous-motion rate is an important advance in improving the convenience and user-friendliness of such a device. If the frame rate is slower such that the output signal is not perceived as continuous motion by the human eye, the spectroradiometer is much more difficult to use by a human being in the sense that motion is perceived as a series of discontinuous stop-action frames. While such a display may be useful in some situations, it is not in others where the observer must view the displayed image over a period of time or where events in the scene are changing rapidly. The latter situation occurs, for example, when the spectroradiometer is in an aircraft flying over the ground and the viewed scene changes rapidly.

In another embodiment, an imaging spectroradiometer comprises an energy collector, including means for spectrally filtering a repeating sequence of spectral images from the viewed image over a preselected spectrum of X-ray wavelengths. The means for spectrally filtering includes means for repeating the spectral imaging of the scene over the preselected spectrum at a preselected sequence repetition frequency, and means for scanning a filter window of a preselected wavelength transmission across the scene during each repetition. There is a normally closed gate which receives the sequence of spectrally filtered images from the means for spectrally filtering and controllably opens at a preselected time to pass an image of a preselected wavelength from the sequence of spectral images. The apparatus further includes means for converting X-ray radiation to light, a detector which receives the light from the means for converting and produces an electronic signal at each of a plurality of pixels, and an image processor. The image processor may be any operable processor, such as that described previously or a slower-speed processor if high-speed analysis is not required.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 5 is a schematic depiction of electronic gating of the detector;

FIG. 6 is a schematic depiction of the relation between the spectral filter and the detector, wherein FIG. 6(a) corresponds to a less preferred approach and FIG. 6(b) corresponds to a preferred approach;

DETAILED DESCRIPTION OF THE INVENTION

Figure 1:
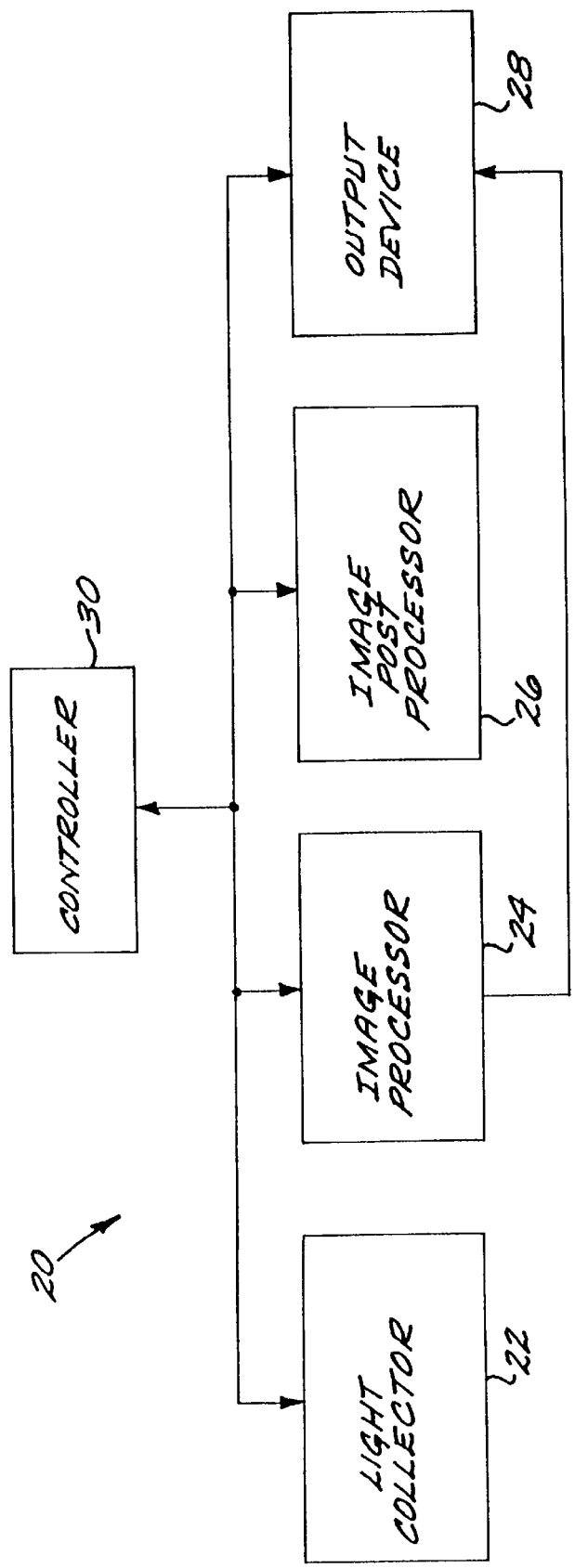
FIG. 1 is an overall system block diagram of a spectroradiometer according to the invention.

FIG. 1 shows a spectroradiometer 20 according to the present invention, in a general form. The spectroradiometer 20 includes a light collector 22, which receives and images light from a scene, selects frames of particular wavelengths, and converts the selected frames to a digital electronic format. A digital electronic representation of the scene is provided from the light collector 22 to an image processor 24, which corrects, calibrates, and processes the image. The image processor 24 delivers the processed image information to an image post processor 26. The post processor 26 manipulates the image in a manner appropriate for specific applications and external requirements of the user of the spectroradiometer 20. The post-processed image is provided to an output device 28, which delivers the image to a video display, an external computer, or other device or display.

A controller 30 controls the operation of the spectroradiometer 20 and, in general, the light collector 22, image processor 24, post processor 26 and output device 30. FIG. 1 depicts the controller 30 interacting with all of the components, but in various embodiments the controller 30 may not interact with all of the components 22, 24, 26, and 28. In almost all cases, the light collector 22 is actively controlled, and in most cases the image processor 24 includes the capability for active control. In some instances, the post processor 26 and the output device 28 may operate independently, and in other cases they may utilize active control. In almost all cases, information from all of these components is provided to the controller 30.

Figure 2:
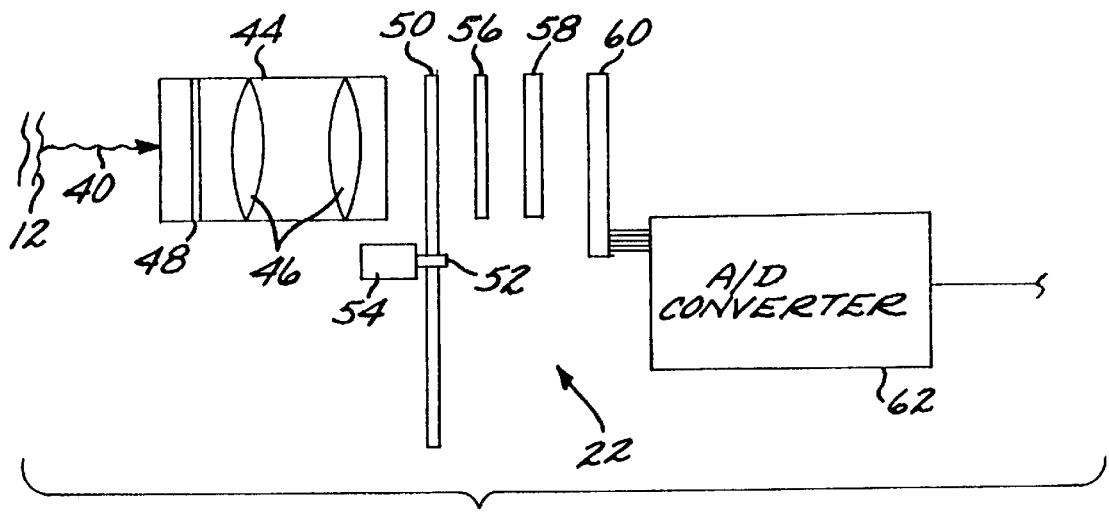
FIG. 2 is a schematic depiction of the light collector of the spectroradiometer.

FIG. 2 depicts the light collector 22 in more detail. Light rays 40 from a scene 42 are received by a lens system 44 that is directed at the scene 42. The lens system 44 contains a conventional focusable lens set 46, that is operable by the controller 30. In the preferred embodiment, the lens set 46 is provided with a 10:1 zoom capability, which is controllable by the controller 30. Lens focusing and zoom capabilities are known in the art. The lens system 44 also contains a precision iris 48 that can be controllably opened or closed by the controller 30 to account for varying light levels in the light rays 40 and the general background. The optical components of the lens system 44 are commercially available as a single packaged unit as the Schneider Varigon 10-100/F1.8 lens system.

After the focused light beam leaves the lens system 44, it passes through a spectrally filtering wavelength filter that controllably passes light of a selected wavelength. (In this application, "light" is used to mean radiation of a filterable wavelength. In the preferred embodiments, the light has a wavelength of from about 400 to about 1200 nm (nanometers). The wavelength filter is preferably a circular variable filter (CVF) 50. The circular variable filter 50 is in the form of a circular disk mounted on an axle 52 and rotationally driven at a controllable angular velocity by a motor 54.

The circular variable filter 50 is available commercially in various wavelength ranges. For example, in the preferred embodiment the CVF 50 is an OCLI Model VC180-017. This continuously variable CVF has a bandpass center wavelength ranging from about 400 nm to about 700 nm as the CVF is rotated by 180 degrees. Two of the 180-degree circular variable filters can be bonded together to form a 360-degree disk which scans through the entire spectrum of about 400 nm to about 700 nm twice in each revolution.

In another embodiment, another CVF which has a varying bandpass center wavelength in the near infrared from about 680 nm to about 1200 nm as it is rotated by 180 degrees may be bonded with the first, visible range, CVF to form a 360-degree disk. This second CVF is available as the OCLI Model CV680-1200. The 360-degree disk with the two filters of different ranges provides spectral selection of about 400 nm to about 1200 nm during each complete rotation of the disk. The approach is applicable to the preparation of filters in the infrared and over broader wavelength ranges, if the other components are suitable.

The circular variable filter 50 is preferably a continuously varied filter. That is, the filter is continuously graded so that any filter wavelength within the range of the filter may be selected. The continuously varied filter is to be contrasted with a circular variable filter having discrete angular segments of filter wavelengths built into the structure of the filter. In the latter case, it is possible to gather spectral information only at those wavelengths built into the filter. In the case of the continuously variable CVF, any set of wavelengths can be selected for imaging.

The continuous variability capability permits, for example, a "broad" spectrum imaging and a "narrow" spectrum imaging. In the "broad" spectrum image, the spectrum might be formed from 20 wavelengths spread evenly over 300 nanometers bandwidth, or 15 nanometers between spectral points. The spectral points are thus spread evenly along the circumference of the preferred CVF from 400 to 700 nanometers. If the user of the system then wishes to image a portion of the spectrum in finer detail to examine specific features such as peak regions, the spectroradiometer can be operated so as to take the 20 spectral wavelengths of the scan from a narrow range, for example, from 400 to 460 nanometers. In this fine-detail scan, which uses only a small portion of the circumference of the CVF, there are only 3 nanometers separation between spectral points, producing a high spectral resolution image.

The rotational angular velocity of the circular variable filter 50 is controlled by the speed of the motor 54, which in turn may be controlled manually or by the controller 30. To achieve a 20 repetitions of the frequency scan or frames per second, for example, the motor 54 and filter 50 must be driven at 10 revolutions per second if the CVF 50 achieves two spectral scans per revolution, or 20 revolutions per second if the CVF achieves only one spectral scan per revolution.

The light leaving the CVF 50 passes through a normally closed optical gate 56. The optical gate 56 is normally closed, not passing any light. It is controllably opened upon command from the controller 30 or manually.

Preferably, but not necessarily, the light passing through the gate falls upon an image intensifier 58. The image intensifier 58 intensifies the amplitude of the image falling upon the device, and is of particular use where the incident light beam 40 may be weak.

In the preferred embodiment that uses an image intensifier, the image intensifier 58 is available commercially as the Varo Model 5772. The image intensifier 58 includes a photocathode, which functions as the optical gate 56. The photocathode emits electrons only when the proper biasing voltage is applied, so that the photocathode biasing voltage can be used as the optical gate control. A proximity focused rather than an electrostatically focused image intensifier is used to ensure an image free of distortion. The variable iris 48, which reduces image intensity of high-intensity light beams 40, and the image intensifier 58, which increases the image intensity of the light beam, together permit the spectroradiometer to operate over a wide range of ambient and scene lighting conditions.

The light beam produced by the image intensifier 58 falls upon a detector 60. The preferred detector is a charge coupled photodiode array formed as an array of 256×256 individual sensor elements. Such a detector is available commercially from EG&G Reticon as the Model 2568N. In the present approach, the detector 60 is reset after 192 lines of vertical resolution, producing a 256 (horizontal)×192 (vertical) pixelated image. Each sensor of the array provides the image intensity at its pixel location.

This type of detector 60 scans through the individual sensor elements in turn at the required frame rate. The output is an analog signal indicative of the sensed image. The light collector 22 includes an analog-to-digital converter 62 that produces a digital output signal responsive to the analog output signal of the detector 60.

The detector 60 can be made to electronically gate the spectrally filtered image to the detector. This approach is equivalent to the use of the optical gate 56 but is more readily implemented when the spectral filter (CVF 50) covers an infrared spectrum and the detector 60 is an infrared detector. The continuously variable spectral filter can be viewed as constituting a succession of filter windows 200, each of a narrow wavelength band, that are scanned across the scene image at the repetition frequency. It is desired to associate the detected image with the narrow window as its projection moves across the face of the detector, so that the output signal is associated with a specific wavelength. In electronic gating of the detector, a succession of corresponding detector gate windows 202, synchronized to the sweep rate of the movement of the filter windows 200 across the detector 60, are scanned across the detector 60 so that the image intensity of the detector pixels within each detector gate window 202 is associated only with the narrow wavelength band within a particular filter window 200 at that moment.

The electronic gating is accomplished as illustrated in FIG. 5. The spectral filter system 50, 52, and 54 includes a position sensor, preferably a rotational transducer 204 on the axle 52 in the case of the use of the CVF, which senses the precise position of the spectral filter. This precise position information is provided to a detector gating controller 206. The pixels of the detector 60 are read in a row-wise fashion. That is, as the image passing through a selected filter window 200' passes across the nth pixel row, the pixel image intensities of that row are read and stored as the nth pixel row portion of the image for the wavelength associated with filter window 200'. As the image passing through the selected filter window 200' passes across the (n+1)th pixel row, the pixel image intensities of that row are read and stored as the (n+1)th pixel row portion of the image for the wavelength associated with filter window 200'. One entire detector output image 208, specifically associated with the wavelength of the filter window 200', is built in that scanned fashion. The pixel rows of the detector output image 208 obtained in this manner have a slight time displacement with each other, which is acceptable in most cases because substantially no movement in the scene can occur during this time, but almost no spectral dispersion. After each pixel row is read, its individual pixel output intensities are set to zero so that it can be used in the same manner with the image of the next filter window 200" passing over the face of the detector. Because each pixel row is exposed for a short period of time as the image of the filter window 200 passes over it, this technique is known as rolling integration.

Figure 7:
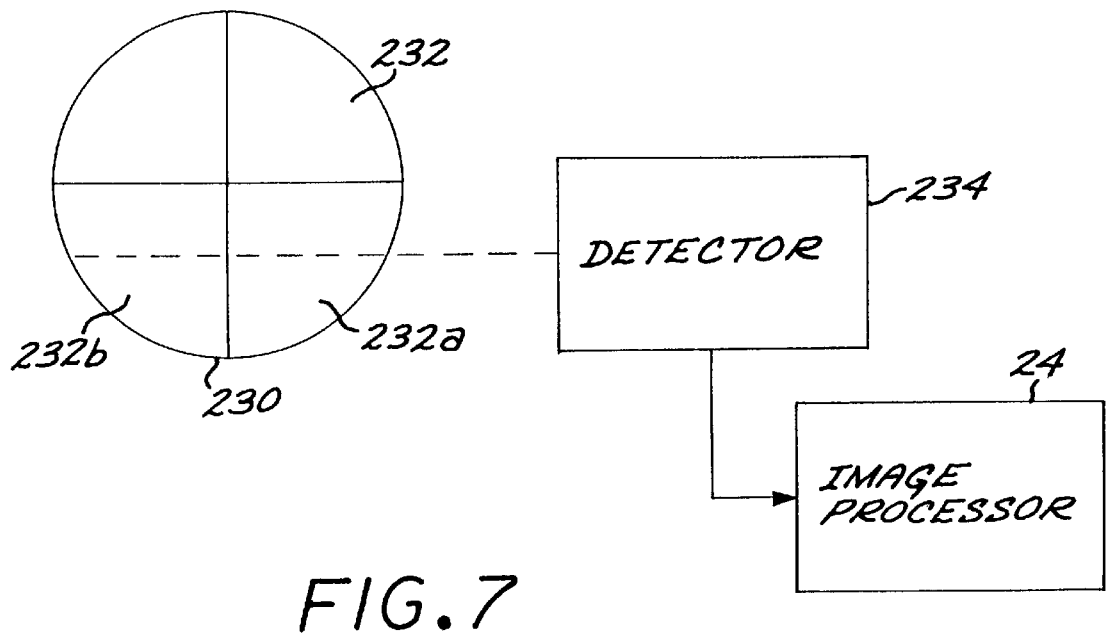
FIG. 7 is a schematic depiction of a snapshot approach to detector gating.

An alternative approach is depicted in FIG. 7. The spectral filter is here depicted as a circular filter wheel 230 formed of a number of discrete filter segments 232, one for each wavelength at which the scene is to be spectrally analyzed. Equivalently, other operable types of spectral filters, such as acousto-optical tunable filters or liquid crystal tunable filters, can be used. The filter wheel 230 is rotated such that one of the discrete filter segments 232a lies between the scene and the detector 234. The scene is imaged onto the detector 234 for the wavelength corresponding to that particular filter segment 232a, and the detector is operated for a period of time sufficient to form the spectrally filtered image of the entire scene at one time. The filter wheel 230 is operated to place another discrete filter segment 232b between the scene and the detector 234, and the process repeats. This technique is termed a "snapshot" approach. In FIG. 7, the filter wheel 230 is shown as having only four discrete filter segments 232 for simplicity of illustration, but in practice there would be many more discrete filter segments 232 on the filter wheel 230.

For all embodiments, the positional relation between the spectral filter, here the circularly variable filter 50, and the detector 60 determines, to some extent, the noise sensed by the detector 60. This positional relation is particularly important when the detector 60 is an infrared detector that must be cooled to cryogenic temperature, specifically 77K, to operate efficiently. As shown in FIG. 6(a), the detector 60 resides in a dewar 220 at 77K, with a window 222 facing the back side of the circularly variable filter 50. The CVF 50 is very efficient in passing a beam 40 of only wavelengths defined by its filter. However, stray energy, represented by a beam 224, can reflect from the back side of the CVF 50, through the window 220, and to the detector 60. The beam 224 corresponds to noise that interferes with the detection of the beam 40 of interest. When the detector 50 is an infrared detector, the beam 224 is not visible light, which can be readily blocked by a housing, but instead is associated with heat energy.

FIG. 6(b) depicts a solution for this problem. The dewar 220 is moved to close proximity with the back side of the CVF 50. The CVF 50 substantially covers the window 222 and acts as a means for preventing radiation 224, other than that passing through the spectral filter, from reaching the detector 60.

In the operation of the light collector 22, the light beam 40 is focused by the lens system 44, and attenuated if necessary by the variable iris 48. That beam passes through the circular variable filter 50, which continuously varies the wavelength of the light that is passed therethrough by virtue of its continuous rotation. The optical gate 56 is synchronized with the operation of the filter 50 to pass, i.e., take "snapshots", of the light beam at selectable rotational angles of the CVF 50. Such nearly instantaneous snapshots sample the light ray 40 at selected wavelengths. The result is a series of individual images, each at a selectable wavelength, of the scene 42. The series contains images at each of the selected wavelengths.

The series of images repeats during the next revolution of the circular variable filter 50. If that series of images repeats at a sufficiently high frequency, a person viewing the image for any one of the preselected frequencies will perceive continuous motion of the image at that viewed frequency. A motion picture is a series of still images, typically presented at a rate of about 30 images per second. If the still images are presented at a substantially lower rate, the movement appears to be jerky. The required repeating or frame frequency is at least 20, and preferably 30, cycles per second to produce the perception of continuous motion. The spectroradiometer of the invention has been designed to operate at a rate of at least 20–30 images at each wavelength per second, and has been reduced to practice at this frame rate. The mechanical, electronic, and computational components described herein permit imaging based upon a 20-point spectrum repeated 30 times per second, for all 256×192 pixels of the array.

The images are intensified if necessary and then detected at the detector 60. The series of images is converted to digital form and then presented to the image processor 24.

The image processor 24 includes a random access memory 70 that is provided as separate memories, or as effectively partitioned memory in a single device, or otherwise as may be operable. Whether there are physically multiple memory devices that constitute the memory 70 or other form, the memory is utilized as follows. A first memory region 70a stores a dark level signal for the detector 60. That is, when the optical gate 56 is closed, ideally there should be no signal from the individual sensor elements of the detector 60. In practice, however, there may be some reading due to the characteristics of the sensor elements, due to variations in the as-fabricated properties of the individual sensor elements, or for other reasons. The first memory region 70a stores the current dark level signal for the detector 60, obtained as the detector reading when the optical gate 56 is closed. This dark level can be updated as necessary, even as frequently as each time the gate is closed. The dark level signal will be used to correct the detector readings, as will be described subsequently.

A second memory region 70b and a third memory region 70c are used in an alternating fashion as follows. As readings are made from the detector 60, they are converted to digital form in the A/D converter 62 and placed into one of the memory regions, assumed to be memory region 70b in this example. As the memory region 70b fills, images at the series of wavelengths L1, L2, etc. are stored. When the memory region 70b is full, storage is shifted to memory region 70c, and it is filled in a similar sequential manner. While memory region 70c is being used to store detector readings, information from memory region 70b is recalled and used in subsequent processing, in the manner to be discussed next. When memory region 70c is filled, storage shifts back to memory region 70b and the information in memory region 70c is recalled for processing. The process of storing and recalling continues to alternate between the two memory regions 70b and 70c, which operate in an autonomous manner.

A separate region 70d of the memory 70 is devoted to the storage of high-resolution spectra. The spectroradiometer 20 may be operated in a high-spectral-resolution mode, where more images and thence points are used to form each spectrum. By way of a trade-off, this mode is typically operated with fewer image pixels and a slower frame rate to permit more extensive data processing. The pixelated images taken during the high-resolution mode are stored in the memory 70d for later analysis, and do not interfere with the continuing operation of the memory regions 70a, 70b, and 70c.

Figure 4:
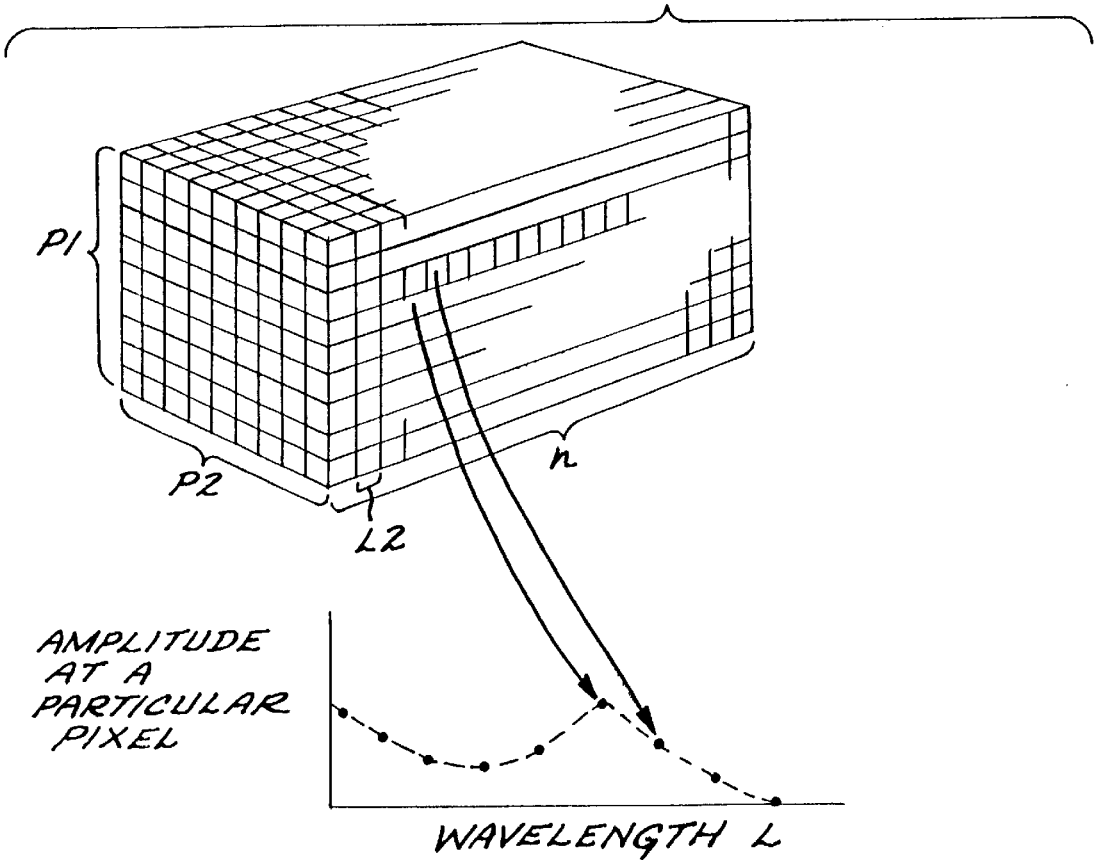
FIG. 4 is a schematic depiction of the storage and subsequent processing approach for the images.

FIG. 4 provides a diagrammatic illustration of the storage approach and the processing approach used in the real-time mode. The image at a selected wavelength L1 may be considered as an array of P1×P2 detector output intensity amplitude values. In the preferred present case, P1 is 192 and P2 is 256. A second image at a second selected wavelength L2 is similarly an array of P1×P2 intensity values, where in general the amplitudes are different in the two images. A total of n images are acquired and stored in this manner, each of the n images comprising an array of P1×P2 pixel values. Upon recall for processing, however, the spectrum of intensities at each selected pixel of the array, [$(P1)_i$, $(P2)_j$] is determined for each of the n images. Thus, as suggested in FIG. 1, a spectrum at a particular pixel is developed. It will be understood that FIG. 4 is intended as an aid in explanation. The information need not be, and is usually not, stored in such an ordered array in memory.

As the values of detector output amplitude that form the spectrum are recalled from memory, they are corrected and calibrated. The value of detector output stored in the memory regions 70b and 70c must be corrected for dark level variations in the individual sensor elements, and must be calibrated to some standard. A dark level corrector 72 recalls the dark level reading of each pixel of the detector array from the memory region 70a. It subtracts the dark level signal from the amplitude of the respective pixel of the detector array signal, as stored in region 70b or 70c, thereby producing a corrected detector signal. The electronic image produced by the detector array is thereby corrected for the dark level, on a pixel-by-pixel basis.

The corrected intensity output values are calibrated by a radiometric conversion unit 74 to account for the optical and optical-electronic properties of the light collector 22. These properties include the optical character of the lenses 46 (such as wavelength-dependent transmission), the character of the image intensifier 58, the variations between the detector sensor elements, the gain of the detector 60, and any other properties that may account for the actual values in the conversion of detector output to actual radiation intensities, other than the content of the scene. If calibration is not performed, subsequently obtained spectral radiances are not meaningful.

Data for the calibration is obtained in an initial series of calibration tests, before the spectroradiometer 20 is placed into service. During the calibration, the instrument is aimed at standard uniform-field images of known spectral radiances. After dark level correction as described above, the calibration amplitude intensities of the individual sensor elements of the detector are recorded in a radiometric calibration programmable read only memory (PROM) 76. Ideally, all of the values would be the same, but in practice they vary due to the various factors discussed above. The detector calibration in the PROM 76 is used to account for these difference.

Another source of potential error that must be accounted for in the calibration is the broadening of the spectrum due to the transmission curve of the filter. The bandwidth of the transmission curve of the circular variable filter 50 is typically about 10 nanometers. To obtain greater resolution, the bandwidth as a function of wavelength is measured during the calibration process and stored in a filter response PROM 82.

When the spectroradiometer 20 is turned on, the calibration values in the PROM 76 are downloaded to a radiometric calibration random access memory (RAM) 78, and the calibration values in the PROM 82 are downloaded into a filter response curve RAM 84. The radiometric conversion unit 74 accesses the RAM 78 to obtain the calibration information for each pixel of the array. The radiometric conversion unit 74 then scales the data recalled from the memory 70 by the calibration values recalled from the RAM 78 on a pixel-by-pixel basis.

The spectroradiometer provides a capability for high-spectral-resolution data collection and analysis. Such data is typically stored in memory region 70d, and recalled for non-real-time data analysis because of the larger number of spectral points collected and analyzed. To perform more sophisticated spectral analysis than is presently possible in real time with a 192×256 array of pixels, a resolution enhancer 80 is provided. The resolution enhancer 80 performs spectral deconvolution of high-resolution spectra on a limited number of pixels. Thus, for example, if a real-time analysis of a scene reveals a small spatial area of particular interest, the limited number of pixels of that area may be analyzed in greater spectral detail by gathering spectral data over a longer period of time, storing that data in the memory 70d, and deconvolving the spectrum on a pixel-by-pixel basis to obtain a highly accurate measure of the spectral radiance of that area. In the deconvolution process, the filter response curve is recalled from the RAM 84.

For either the enhanced-resolution or real-time modes of operation, the corrected and calibrated image values are available for use directly. However, for most applications they are desirably processed in terms of the spectral responses of the user of the image. Stated alternatively, the spectroradiometer output can emulate any selected type of sensor. The sensor is defined by its spectral response curve. The sensor emulation is accomplished by the following convolution calculation:

$$I = \int L(\lambda) C(\lambda) d\lambda,$$

where I is the numerically computed integral, L is the corrected and calibrated spectral radiance as a function of wavelength $\lambda$, and C is the spectral response curve of the sensor. In most cases, multiple integrals of this type are performed for the tristimulus response curves of most sensors. For example, if the image is to be displayed on a monitor for viewing by a human eye, the corresponding integrals for both the monitor and the human eye must be calculated. There are three tristimulus integrals X, Y, and Z for the human eye, and three tristimulus integrals R, G, and B for the monitor, for a total of six integrals. The preferred embodiment of the invention is designed to compute these six integrals.

Accomplishing the integration calculation in real time for the spectral radiance of each pixel of the image array, in the preferred case an array of 256×192 pixels, is a computational challenge. It is performed in the preferred case by a high-speed hardware multiplier-accumulator (MAC). The multiplier-accumulator is a hardware device in which two functions are multiplied together and added to a running sum, which becomes the integrated total value. In the present approach, the multiplier-accumulator is an Integrated Device Technology Model 7210. Where several integrals are to be calculated, six in the present case, a multiplier-accumulator is dedicated to the computation of each of the integrals. Thus, in the present approach, a bank of six MACs 86 is provided.

Each of the MACs in the bank 86 receives three inputs. One is the spectral radiance L from the radiometric conversion unit 74. This spectral radiance L is identified as image intensity as a function of degree of rotation of the circular variable filter 50. The second input is a response function C, which is stored in a spectral response ROM 88. Any response function or group of response functions can be provided, which permits the spectroradiometer to emulate any type of sensor or device. As noted, in the preferred embodiment the X, Y, Z, R, G, B response functions are stored and recalled, each to one of the six MACs. The spectral response functions are stored as intensities as a function of wavelength. The third input is a calibration relation between the degree of rotation of the circular variable filter 50 and the wavelength of light transmitted through the filter. This relation is obtained during initial calibration of the spectroradiometer 20. The calibration is stored in a spectral calibration PROM 90, and downloaded to a spectral calibration RAM 92 when power is supplied to the spectroradiometer. This calibration allows the correct values from the spectral radiance L and the spectral response C to be properly paired for multiplication and addition to the running sum.

Another important computational capability permits the spectroradiometer to act as a discriminator or match filter. That is, the spectroradiometer can highlight features having a particular spectral response function. Many computational approaches are known to perform the discrimination. In one approach cited as an example, an integral I' is numerically computed as $$I' = \int [L(\lambda) - \langle L(\lambda) \rangle][C(\lambda) - \langle C(\lambda) \rangle] d\lambda$$

All features with the spectral response curve C are displayed with a bright image, and the intensities of features not having this spectral response curve C are suppressed. A number of such match filtering approaches are possible, as is known in the art.

In the real-time mode of operation, the image processor 24 is synchronized to the operation of the spectral filter, in this case the circular variable filter 50. Synchronization is accomplished by the system architecture and component selection that allows the image processor 24 to operate at the frame rate dictated by the CVF 50, typically 20–30 frames per second or more. Synchronization is also enabled by measuring the exact rotational position of the CVF and associating that position with a spectral value through the information in the spectral calibration RAM 92. The synchronization of the spectral filter and the image processor permits the output of spectral response curves, discriminations, or other information at the same repetition rate of operation of the spectral filter and contemporaneous with the gathering of the data and its filtering with the spectral filter. It has not heretofore been possible to provide such synchronized outputs in real time for a two-dimensional image array.

In this regard, it is important to distinguish two-dimensional imaging, as performed in the present device, from scanned one-dimensional imaging. One prior design philosophy for spectroradiometers has been to generate a one-dimensional image array, and to scan that array in a second dimension through a scene. This approach does not permit real-time imaging at frame rates of at least 20–30 frames per second, as required to produce a perception of continuous motion. By the time that a scan in the second dimension is completed, the scene may have changed such that spectral information generated at the begin of the second-dimension scan is obsolete by the end of the scan. The displayed image is therefore formed of information taken at different times, and is therefore not an actual scene that occurred at any time. By contrast, the present approach spectrally filters and then detects all of a two-dimensional image presented by the lens system at any moment, thereby providing a spectral record at one light wavelength of the actual scene that was viewed at that moment. All other points of the spectrum are gathered in $\frac{1}{20}$–$\frac{1}{30}$ of a second or less, in the real-time mode.

The computed integrals I or I' can be output directly to viewing devices of various types through the output system 28, and the preferred embodiment of the spectroradiometer provides several capabilities to support image output. Data useful in radiometrically interpreting the spectra may be encoded onto the images by a data encryptor 96. The image may be held in a processed data buffer memory 98 as needed. The preferred embodiment further provides a 6-channel RS-170 video output formatter 100 used to format the images for presentation on a standard video monitor. Some or all of these output devices may be omitted, or others may be introduced, for specific applications of the spectroradiometer.

The computed integrals I or I' can be further processed in a post-processor 102 prior to output, if desired for a particular application. For example, it may be desired to form an output of X/(X+Y+Z). This further manipulation of the output integrals I or I' is performed by the post-processor 102. If post-processing is used, the post-processed information can be output through the devices 96, 98, and 100, or other output devices, as desired.

The controller 30 includes capabilities necessary to control the mechanical, computational, output, and data transfer functions of the spectroradiometer 20, according to the functions and hardware described previously. A system central processing unit (CPU) 110 coordinates the control function and hardware. It receives external inputs from a back-panel control 112, an RS-232 external connector 114, and an IEEE-488 connector.

Figure 3A:
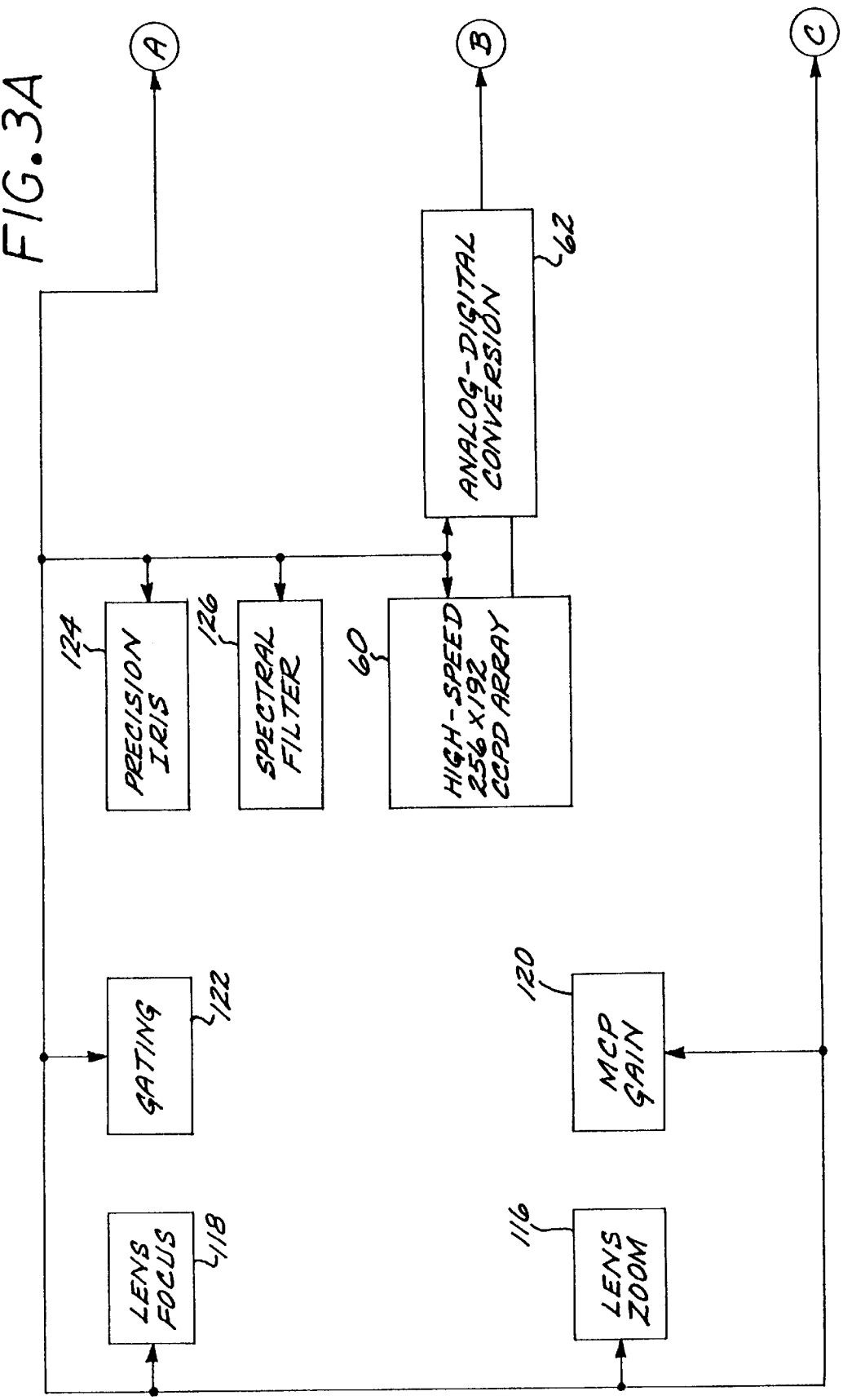
FIG. 3 is a detailed block diagram of the spectroradiometer.
Figure 3B:
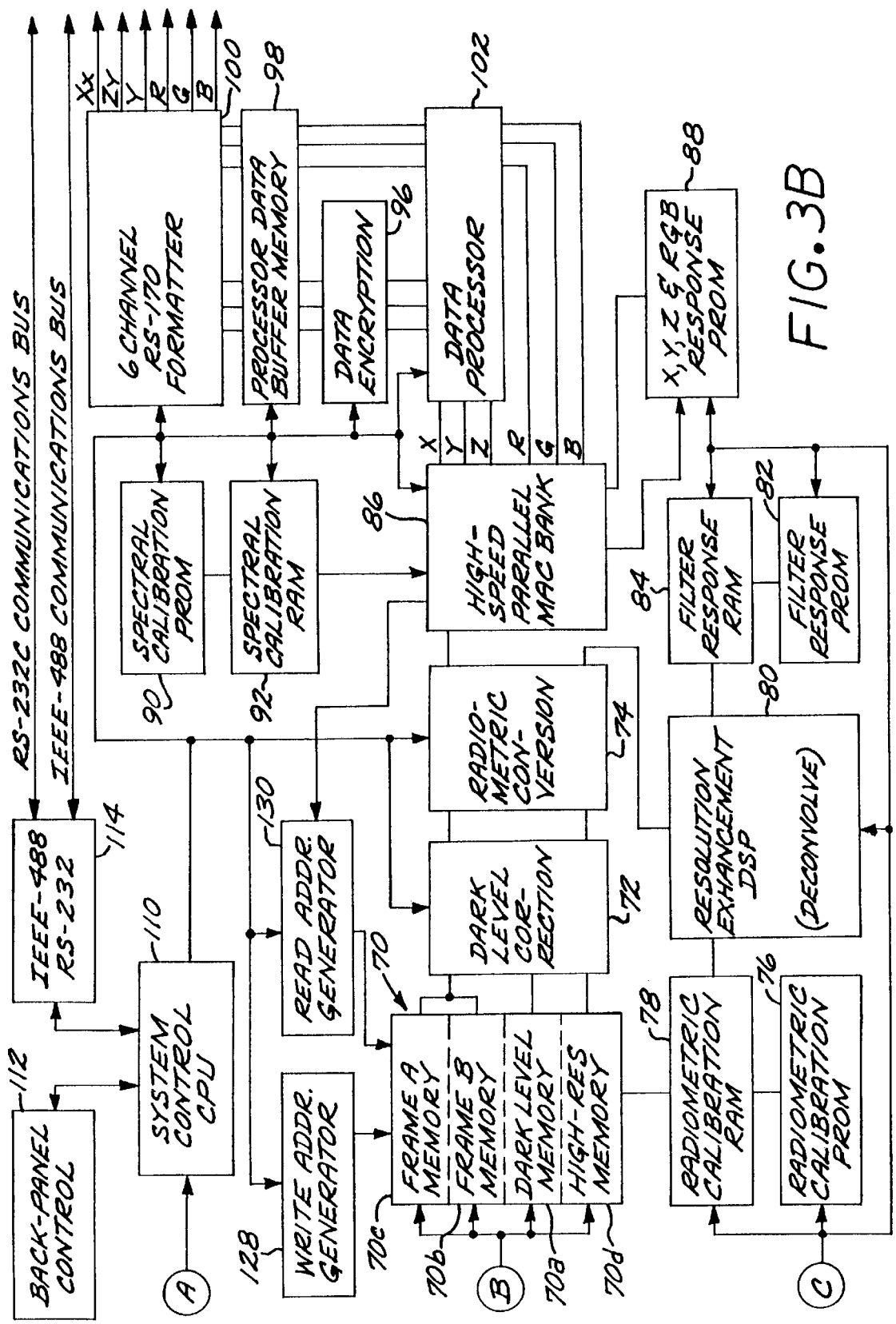

The CPU 110 controls the various mechanical functions. It commands lens zoom actuators 116, lens focus actuators 118, intensifier gain 120, and an opening actuator 122 of the optical gate 56. It further commands an iris opening actuator 124 and a drive motor 126 of the circular variable filter 50. The controlled values of these mechanical systems are made available to the other portions of the system as required, according to the data flow paths indicated in FIG. 3.

To keep track of memory storage locations, there are provided a write address generator 128 and a read address generator 130. These devices determine the locations to which information is written and from which information is recalled. The coordinated operation of these address generators 128 and 130 permits the images to be alternatively written and recalled from the memories 70b and 70c. The write address generator 128 and the read address generator 130 may be integral with the memory device 70, or may be supplied separately.

The present invention has been embodied in a packaged spectroradiometer according to the preferred embodiments discussed herein. The instrument produces a 20-point spectral radiance from 400 to 700 nanometers wavelength, for each pixel of a 256×192 imaging array, at a frame rate of 30 frames per second. Each frame includes a complete 20-point spectrum for each pixel. This frame rate permits the image to be viewed with smooth motion, much in the manner of a conventional television or motion picture. The displayed image, however, differs from that of a conventional television or motion picture in that it emulates a particular sensor of spectral response function C or can otherwise be controlled to highlight features having preselected spectral response functions.

Figure 8:
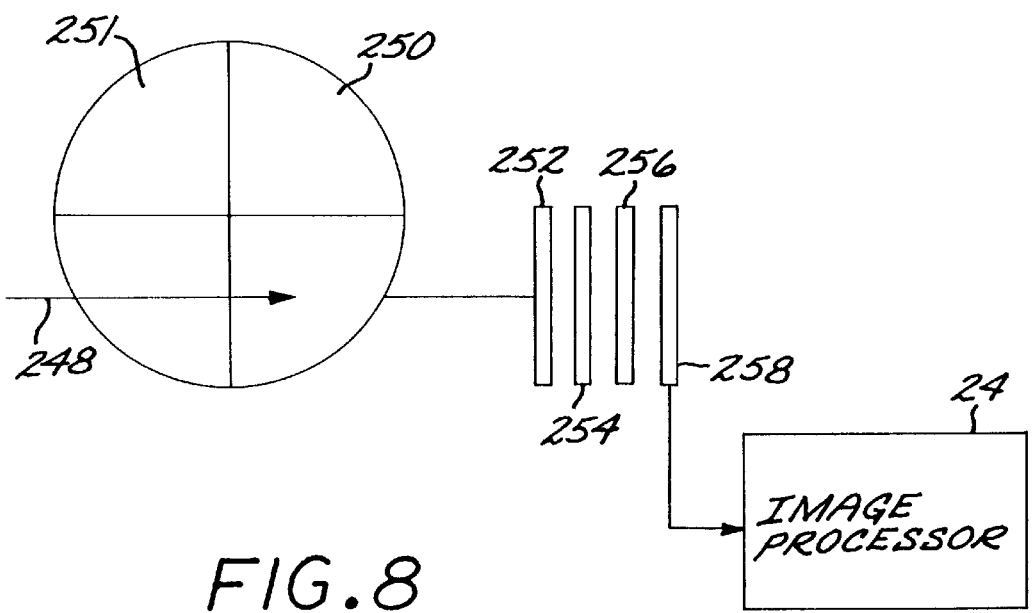
FIG. 8 is a schematic illustration of an X-ray imaging spectroradiometer.

The present invention can be used to perform spectroradiometry on X-ray images as well as those of visible and infrared wavelengths, as illustrated in FIG. 8. An X-ray beam 248 is directed through an object to be spectrally analyzed, and thereafter onto an X-ray spectral filter 250. The X-ray spectral filter is illustrated as a circularly variable filter with discrete filter segments 251, similar in this regard to the filter 230 used for the snapshot technique of FIG. 7. That is, the entire scene is imaged at once, rather than using the alternative and acceptable rolling integration approach. However, the filter segments 251 filter X-ray wavelengths of about 10 nanometers and less, as distinct from visible or infrared wavelengths. Such filter segments operate based upon the passage of X-rays through sets of metallic filter elements having closely adjacent absorption edges. The X-ray spectral filter 250 could alternatively be an X-ray spectrometer. The filtered, approximately chromatic X-ray beam passing through the filter segments 251 impinges upon a fluorescent screen 252, which produces visible light output proportional to the intensity of the impinging X-rays at a location. The visible light is thereafter processed in much the same manner as discussed previously. The visible light controllably passes through an optical gate 254 (or electronic gating as discussed previously), is intensified by an image intensifier 256 if desired, and is converted to an electrical signal by a detector 258. The output signal of the detector proceeds to an image processor 24 which may be of the type discussed previously. Alternatively, since real-time imaging is not required for most contemplated applications of X-ray spectroradiometry and higher resolution is instead preferred, a slower-speed image processor, but still utilizing the same processing principles, can be used.

The ability to process the images in real time permits the user to follow continuous motion on a real-time basis, for any selected response function or functions. Thus, real-time spectral discrimination of geological, oceanographic, agricultural, medical, and many other types of scenes can be accomplished. With the broad-ranging capabilities of the system, other options are also possible. For example, the frame rate can be slowed, and the spectral resolution can be correspondingly increased within the limitations of the computational rates available, in the high-resolution mode discussed previously.

Although a particular embodiment of the invention has been described in detail for purposes of illustration, various modifications may be made without departing from the spirit and scope of the invention. Accordingly, the invention is not to be limited except as by the appended claims.

What is claimed is:

1. An imaging spectroradiometer, comprising:
   a light collector comprising a detector that receives the energy of a viewed scene and produces responsive electrical outputs, the light collector being operable to produce a repeating series of digital electronic representations of the electrical outputs of the detector as (P1,P2,L) data sets over a range of P1 spatial values, a range of P2 spatial values, and a range of L wavelength values, the series of (P1,P2,L) data sets repeating at a repetition frequency of at least about 20 cycles per second; and
   an information processor operating at the repetition frequency of at least about 20 cycles per second, the information processor comprising
      a correlator which correlates the series of (P1,P2,L) data sets received from the light collector with a spectral response function at the repetition frequency of at least about 20 cycles per second.

2. The imaging spectroradiometer of claim 1, wherein the information processor further includes
   a memory which temporarily stores the data sets produced by the light collector, and
   wherein the correlator receives the data sets from the memory.

3. The spectroradiometer of claim 2, wherein the memory comprises a first memory region and a second memory region, and wherein the spectroradiometer further comprises a memory control which stores electronic information in the first memory region while simultaneously recalling electronic information from the second memory region.

4. The imaging spectroradiometer of claim 1, further including
   an amplitude corrector which corrects the amplitudes of the detector outputs responsive to systematic sources of error, and
   a calibrator which calibrates the amplitudes of the detector outputs responsive to the properties of the light collector,
   the amplitude corrector and the calibrator each operating at the repetition frequency of at least about 20 cycles per second.

5. The imaging spectroradiometer of claim 1, wherein the repetition frequency is at least about 30 cycles per second.

6. The imaging spectroradiometer of claim 1, further including
   a lens positioned between the viewed scene and the detector.

7. The spectroradiometer of claim 1, wherein the wavelengths are in the infrared, and wherein the detector is an infrared detector.

8. The spectroradiometer of claim 1, wherein the detector comprises an array of sensor elements.

9. An imaging spectroradiometer, comprising:
   a light collector comprising a detector that receives the energy of a viewed scene and produces responsive electrical outputs, the light collector being operable to produce a repeating series of digital electronic representations of the electrical outputs of the detector in the form of data sets having two spatial variables and a wavelength variable, the series of data sets repeating at a repetition frequency of at least about 20 cycles per second; and
   an information processor operating at the repetition frequency of at least about 20 cycles per second, the information processor comprising
      a correlator which correlates the series of data sets received from the light collector with a spectral response function at the repetition frequency of at least about 20 cycles per second.

10. The imaging spectroradiometer of claim 9, wherein the information processor further includes
    a memory which temporarily stores the data sets produced by the light collector, and
    wherein the correlator receives the data sets from the memory.

11. The imaging spectroradiometer of claim 9, further including
    an amplitude corrector which corrects the amplitudes of detector outputs responsive to systematic sources of error, and
    a calibrator which calibrates the amplitudes of the detector outputs responsive to the properties of the light collector,
    the amplitude corrector and the calibrator each operating at the repetition frequency of at least about 20 cycles per second.

12. The imaging spectroradiometer of claim 9, wherein the repetition frequency is at least about 30 cycles per second.

13. The imaging spectroradiometer of claim 9, further including
   a lens positioned between the viewed scene and the detector.

14. A method for analyzing a scene, comprising the steps of:
   viewing a scene with a spectroradiometer having a light collector;
   repetitively producing a digital electronic representation of the viewed scene with the light collector of the spectroradiometer, the light collector being operable to produce a repeating series of digital electronic representations of the electrical outputs of the detector as (P1,P2,L) data sets over a range of P1 spatial values, a range of P2 spatial values, and a range of L wavelength values, the series of (P1,P2,L) data sets repeating at a repetition frequency of at least about 20 cycles per second; and
   correlating the series of (P1,P2,L) data sets received from the light collector with a spectral response function at the repetition frequency of at least about 20 cycles per second.

15. The method of claim 14, wherein the repetition frequency is at least about 30 cycles per second.

* * * * *